US010284566B2

(12) United States Patent
Khosravi et al.

(10) Patent No.: US 10,284,566 B2
(45) Date of Patent: May 7, 2019

(54) PROXIMITY DETECTION SYSTEM (71) Applicant: Intel Corporation, Santa Clara, CA (US)

(72) Inventors: Hormuzd M. Khosravi, Portland, OR (US); David A. Bronleewe, Hillsboro, OR (US); Khaled Almahallawy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/088,771

(22) Filed: Apr. 1, 2016

(65) Prior Publication Data

US 2017/0289118 A1   Oct. 5, 2017

(51) Int. Cl.
| *G06F 7/04* | (2006.01) |
| *H04L 29/06* | (2006.01) |
| *H04W 12/06* | (2009.01) |
| *H04W 4/80* | (2018.01) |

(52) U.S. Cl.
CPC ............. *H04L 63/107* (2013.01); *H04W 4/80* (2018.02); *H04W 12/06* (2013.01); *H04L 2463/082* (2013.01)

(58) Field of Classification Search
None
See application file for complete search history.

(56) References Cited

U.S. PATENT DOCUMENTS

| 6,859,761 | B2 | 2/2005 | Bensky et al. |
| 8,826,415 | B2 | 9/2014 | Last |
| 9,179,254 | B1* | 11/2015 | Viswanadham ...... H04W 4/008 |
| 2003/0115321 | A1* | 6/2003 | Edmison .................. H04L 1/20 709/224 |
| 2007/0249288 | A1* | 10/2007 | Moallemi ........... H04L 63/0492 455/68 |

(Continued)

FOREIGN PATENT DOCUMENTS

| EP | 2733502 A1 | 5/2014 |
| KR | 101121586 | 3/2012 |
| KR | 1020160030797 | 3/2016 |

OTHER PUBLICATIONS

"International Application Serial No. PCT/US2017/019286, International Search Report dated May 24, 2017", 3 pgs.

(Continued)

*Primary Examiner* — Brandon S Hoffman
(74) *Attorney, Agent, or Firm* — Schwegman Lundberg & Woessner, P.A.

(57) ABSTRACT

Various systems and methods for providing a walk away lock are provided herein. A plurality of data packets may be received at a compute device from a user device. Here, each packet has corresponding time-to-receive value. A baseline latency value of the plurality of data packets may be determined based on their respective time-to-receive values. Additional data packets may be received from the user device, each of these additional data packets having their own corresponding time-to-receive values. A current latency value of the additional data packets may be calculated based on the respective time-to-receive values. A security operation may be performed based on the baseline latency value and the current latency value.

24 Claims, 6 Drawing Sheets (56) References Cited

U.S. PATENT DOCUMENTS

| | | | |
|---|---|---|---|
| 2013/0305357 A1* | 11/2013 | Ayyagari | H04W 12/06 |
| | | | 726/22 |
| 2014/0330998 A1 | 11/2014 | Dees et al. | |
| 2015/0188949 A1* | 7/2015 | Mahaffey | H04L 63/20 |
| | | | 726/1 |
| 2015/0280843 A1 | 10/2015 | Fucci | |
| 2015/0347738 A1 | 12/2015 | Ulrich et al. | |

OTHER PUBLICATIONS

"International Application Serial No. PCT/US2017/019286, Written Opinion dated May 24, 2017", 6 pgs.
"Bluetooth PC LockItNow!", PC World, https://web.archive.org/web/20140301060343/http:/www.pcworld.com/product/1002369/bluetooth-pc-lockitnow-.html, (Mar. 1, 2014), 1 pg.
"GateKeeper—Locate and Alert", Google Play—CoolCAD Electronics, https://play.google.com/store/apps/details?id=com.coolcadelectronics.gatekeeper Accessed on Apr. 18, 2018, (Aug. 13, 2014), 3 pgs.

* cited by examiner

PROXIMITY DETECTION SYSTEM

TECHNICAL FIELD

Embodiments described herein generally relate to networking and in particular, to proximity detection.

BACKGROUND

Multi-factor authentication (MFA) is a scheme for controlling access to computers in which a user is only granted access after presenting separate pieces of identification evidence to an authentication system. Multi-factor authentication schemes may be two-factor (e.g., requiring two pieces of information), three-factor, or more. Factors are conventionally broken out into rough categories of knowledge, possession, and inherence. In other words, factors are representative of what one knows (knowledge), what one has (possession), and what one is (inherence). Examples of knowledge factors include usernames, passwords, personal identification numbers (PINs), and the like. Examples of possession factors include an RFID tag, a pass card, and the like. Examples of inherence factors include fingerprints, retinal scans, and other biometric data.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a mechanism to detect user proximity to a compute device using Bluetooth latency. User proximity or presence near a computer or other secured computing resource, is an important factor in determining whether the user should be authenticated to the computer (e.g., logged in or allowed to use different enterprise apps) in a Multi-factor Authentication (MFA) system. The systems and methods described here provide for detection of user proximity based on Bluetooth (BT) protocol latency.

Current approaches to determine proximity have been based on BT RSSI (Receiver signal strength Indicator), which utilizes power readings to determine distance. In comparison to using communication latency measurements, using RSSI consumes large amounts of power and has other drawbacks. Using BT latency, as described herein, requires less power than RSSI analysis, and is scalable across BT and BLE (BT Low Energy). It does so in a unique way where the latency of BT messages may be used to determine user proximity without utilizing high power beacons.

Several potential advantages may be realized by the systems described herein, including power saving, adaptability/scalability, broad applicability, and security/productivity. In particular, for example, the system provides power savings over the approach of using RSSI readings to detect proximity, including estimations of up to 50% less power consumption on phone and computer platforms. The approach is adaptable and scalable to different apps running on a phone platform, which may be consuming BT. It is also adaptable to different external environments where the BT power/bandwidth is impacted. The approach may also work over classic Bluetooth and Bluetooth Low Energy (BLE). Using a proximity authentication mechanism provides both better security and productivity for the user, because the user does not have to remember to lock and unlock the PC when he walks away. Other advantages will become apparent in view of the continuing discussion.

Figure 1:
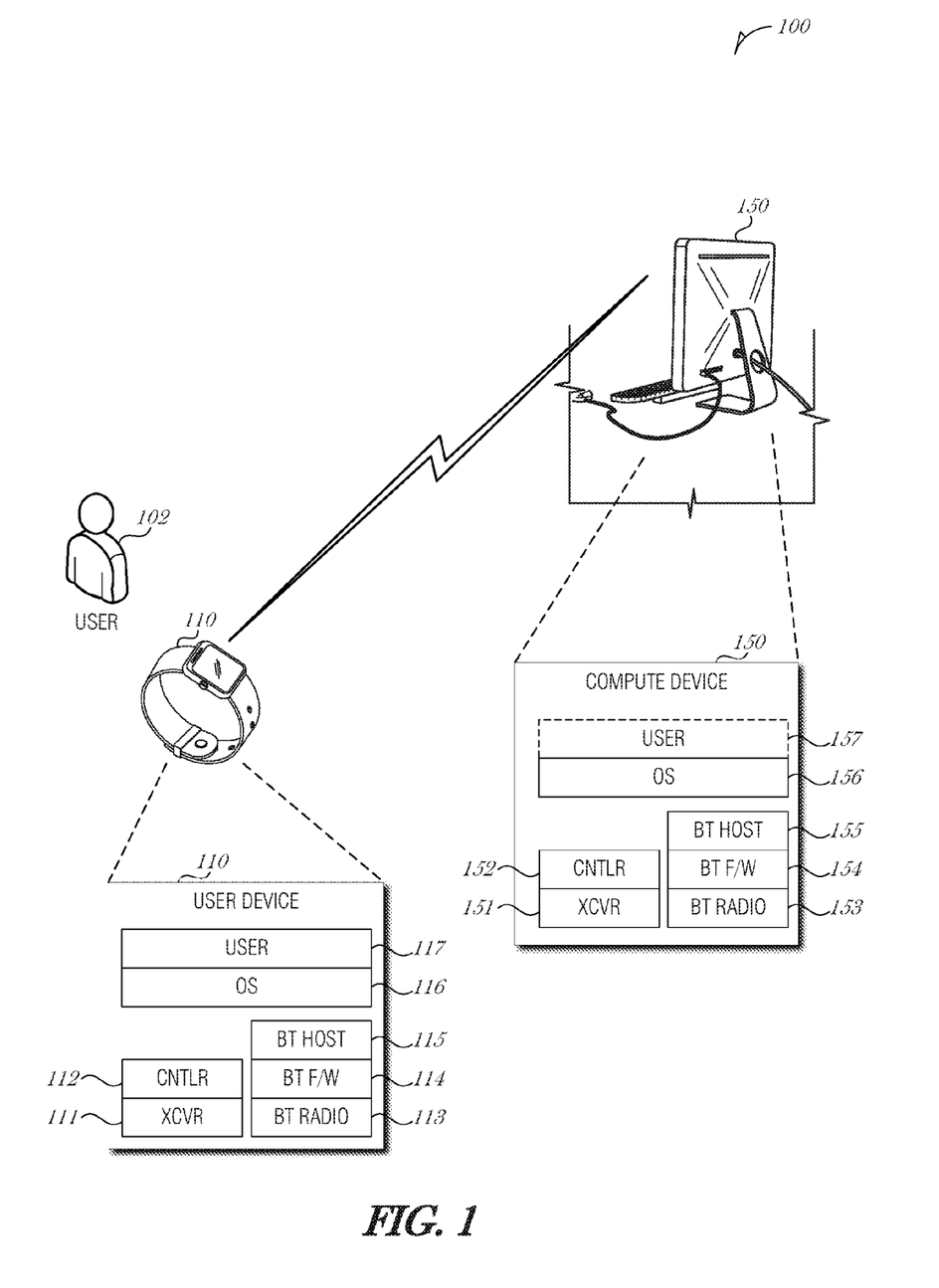
FIG. 1 is a schematic diagram illustrating an operating environment, according to an embodiment.

FIG. 1 is a schematic diagram illustrating an operating environment 100, according to an embodiment. The operating environment 100 includes a user device 110 and a compute device 150. The user device 110 may be any type of compute device including, but not limited to a smartphone, a laptop, a hybrid computer, a tablet, a phablet, a smartwatch, a fob, a token, or other similar suitable devices that are able to communicate over Bluetooth with the compute device 150. The compute device 150 includes, but is not limited to any type of device capable of performing a compute function and connecting over a Bluetooth or BLE connection. Examples include a laptop, a desktop, a hybrid, a tablet, an in-vehicle infotainment system, a home automation system, a manufacturing computer control system, or other computing devices that may be secured.

The user device 110 includes a transceiver 111, capable of both sending and receiving data, and controlled by controller 112. The transceiver 111 and controller 112 may be used to communicate over various wireless networks, such as a cellular network, such as a network designed according to the Long-Term Evolution (LTE), LTE-Advanced, 5G or Global System for Mobile Communications (GSM) families of standards.

Similarly, the compute device 150 includes a transceiver 151 and controller 152, which may be able to communicate over various networks like the user device 110. Alternatively, instead of using a combined transceiver, the user device 110 or compute device 150 may include separate transmitter and receiver units that are each controlled by respective controllers 112, 152.

Both the user device 110 and compute device 150 also include Bluetooth hardware, firmware, and software to enable Bluetooth connectivity according to the IEEE 802.15 family of standards. The user device 110 includes a Bluetooth radio 113 controlled by Bluetooth firmware 114 and Bluetooth host 115. Similarly, the compute device 150 includes a Bluetooth radio 153 controlled by Bluetooth firmware 154 and Bluetooth host 155. Operating systems 116, 156 interface with the respective controllers 112, 152, and Bluetooth hosts 115, 155. Examples operating systems 116, 156 include desktop operating systems, embedded operating systems, real-time operating systems, proprietary operating systems, network operating systems, and the like. Examples include, but are not limited to Windows® NT (and its variants), Windows® Mobile, Windows® Embedded, Mac OS®, Apple iOS, Apple WatchOS®, UNIX, Android™, JavaOS, Symbian OS, Linux, and other suitable operating system platforms.

A communication controller (not shown) may be implemented in hardware, firmware, or in the operating system 116, 156 of the respective device. The communication controller may act as an interface with various hardware abstraction layer (HAL) interface, such as device drivers, communication protocol stacks, libraries, and the like. The communication controller is operable to receive user input (e.g., from a system event or by an express system call to the communication controller), and interact with one or more lower-level communication devices (e.g., Bluetooth radio, cellular radio, etc.) based on the user input. The communication controller may be implemented, at least in part, in a user-level application that makes calls to one or more libraries, device interfaces, or the like, to cause communication devices to operate in a certain manner.

A user application space 117, 157 on the user device 110 and on the compute device 150, are used to implement user-level applications, controls, user interfaces, and the like, for a user 102 to control the respective device. An application, app, extension, control panel, or other user-level executable software program may be used to control access to the user device 110 or compute device 150. For example, an executable file, such as an app, may be installed on the user device 110 and operable to respond to a host application installed on the compute device 150. When the host application contacts the app on the user device 110, the app responds with a data packet. The host application on the compute device 150 measures the time the data packet takes to be received at the compute device 150. Over time, the compute device 150 may make several requests to establish a baseline and measure the estimated distance as it changes over time. When the distance exceeds a threshold, then the compute device 150 may lock or log off the user 102 of the user device 110.

In operation, the user 102 may pair the user device 110 with the compute device 150 using a Bluetooth pairing protocol. The user 102 may also enroll the user device 110 with the compute device 150. When the user 102 is within proximity to the compute device 150 with the user device 110, the user device 110 and compute device 150 connect over the previously-paired Bluetooth connection, the compute device 150 checks to see if the user device 110 is enrolled, and the user 102 is able to access the compute device 150 (e.g., log in, use application, access hardware and software components associated with the compute device 150, etc.).

When the user 102 leaves the proximity of the compute device 150, one or more security protocols may be activated to secure the compute device 150. For example, the compute device 150 may lock when the user 102 walks away. This may be referred to as a "walk away lock" (WAL). When the user 102 returns, several actions may occur, depending on the design of the WAL. In one example, the compute device 150 may automatically unlock when the user 102 approaches. The user's account may have been locked in a manner such that when the user 102 returns the operating environment is substantially returned to the state right before the user left. Alternatively, instead of using an account locking mechanism, the compute device 150 may log off when the user leaves. In such a case, the compute device 150 may present a user login interface for the user to enter credentials and access the compute device 150 and associated resources. Other security protocols may be used without departing from the scope of this disclosure.

In order to implement the WAL, the present mechanisms use a latency measurement and tracking system. Such as system is useful because it does not involve high-strength radio signals, which are used in an RSSI-based proximity system, and which may impact battery life and computing efficiency of the user device 110. Further details are provided in the following figures and description.

Figure 2:
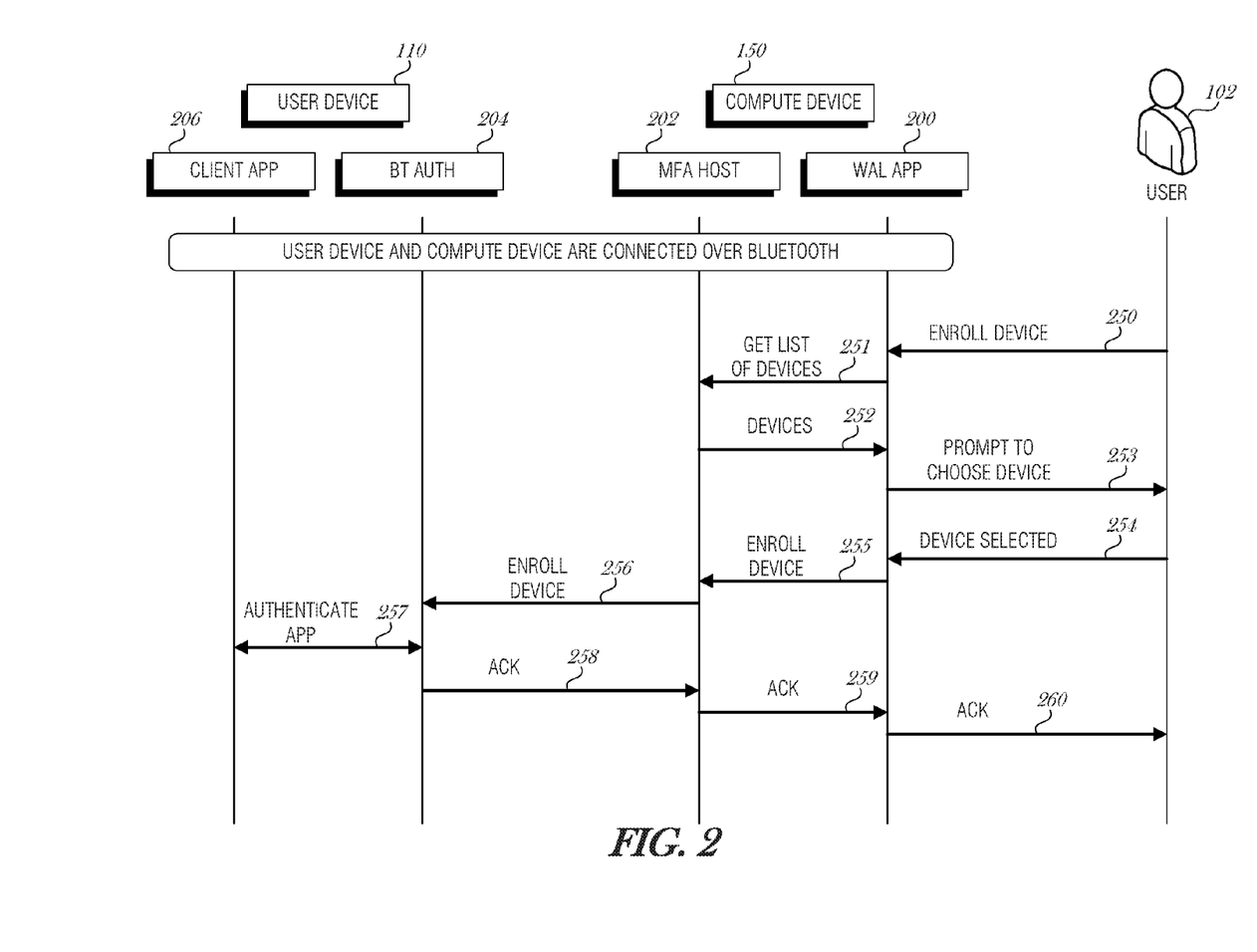
FIG. 2 is a swim lane diagram illustrating message traffic between the user device and the compute device to enroll a user device, according to an embodiment.

FIG. 2 is a swim lane diagram illustrating message traffic between the user device 110 and the compute device 150 to enroll a user device 110, according to an embodiment. The user device 110 and compute device 150 are connected over Bluetooth or BLE. The user 102 interacts with the compute device 150 to enroll the user device 110. In particular, the user 102 issues one or more user interface commands to a (Walk-Away-Lock) WAL application 200 operating on the compute device 150, to enroll the user device 110 (message/operation 250). The WAL application 200 may be a user-level application executing in user space on the compute device 150. For example, the WAL application 200 may be provided by an independent software vendor (ISV) to work with the infrastructure provided on the compute device 150. The WAL application 200 provides the user interface for a walk away lock security interface on the compute device 150. Various functions may be performed using the WAL application 200, such as enrolling or un-enrolling devices, setting user preferences, setting threshold values, and the like. The user 102 may need administrative privileges to set some or all of the preferences of the WAL application 200.

The WAL application 200 requests a list of devices currently paired to the compute device 150 (message/operation 251). The WAL application 200 interfaces with a multi-function authentication (MFA) host 202 to obtain the list. The MFA host 202 is used to perform the various latency measurements, interface with the operating system to lock/unlock the compute device 150, and perform other security-related functions. The MFA host 202 may be incorporated into the operating system, device driver, Bluetooth firmware, or in a separate security module (e.g., a trusted execution environment). The MFA host 202 maintains a list of enrolled devices in local secured memory. In an alternative example, the MFA host 202 may maintain the list of enrolled devices in a cloud storage location. When the WAL application 200 requests the list of devices, the MFA host 202 may interface with the Bluetooth host to obtain a list of devices currently connected to the compute device 150, and return the list to the WAL application 200 (message/operation 252).

The user device 100 is provided in the list that is returned and the user 102 (message/operation 253), and the user 102 selects the appropriate device to enroll (message/operation 254). The WAL application 200 forwards the user's selection to the MFA host 202 (message/operation 254), which then interfaces with the appropriate Bluetooth hardware and software to communicate with a Bluetooth authenticator 204 on the user device 110 (message/operation 255). The Bluetooth authenticator 204 may be part of a suite of applications designed to work together and provide a multi-function authentication. Thus, in an example, the Bluetooth authenticator is an applet or other companion software to work with the MFA host 202. The Bluetooth authenticator 204 may operate over a secure channel with the MFA host 202, in order to provide heightened security over typical Bluetooth security.

A Bluetooth message is sent to the user device 110 to connect the WAL application 200 and a client app 206 executing on the user device 110 (message/operation 256). This message 256 may be encrypted, for example with a private-key infrastructure (PKI) mechanism. The PKI mechanism may be based on a Diffie-Hellman scheme, RSA algorithm, Lamport signatures, Merkle signatures, hash trees, Rabin signatures, or other suitable PM schemes.

The Bluetooth authenticator 204 authenticates the client app 206, such as with a hash key analysis, checksum, or other mechanism (message/operation 257). Once the client app 206 is authenticated, then the proper acknowledgements are returned back through the call chain (message/operations 258, 259, 260). Acknowledgements 258-260 may cause additional operations to occur (not shown), such as recording the state of the client app 206 or user device 110 at the MFA host 202, presenting confirmation screens or other output to the user, or the like.

After the pairing the client app 206 and WAL application 200 running on the compute device 150, an active Bluetooth connection is maintained while the user 102 is in Bluetooth range with the compute device 150. The WAL application 200 implements the logic for user proximity detection based on Bluetooth latency.

Figure 3:
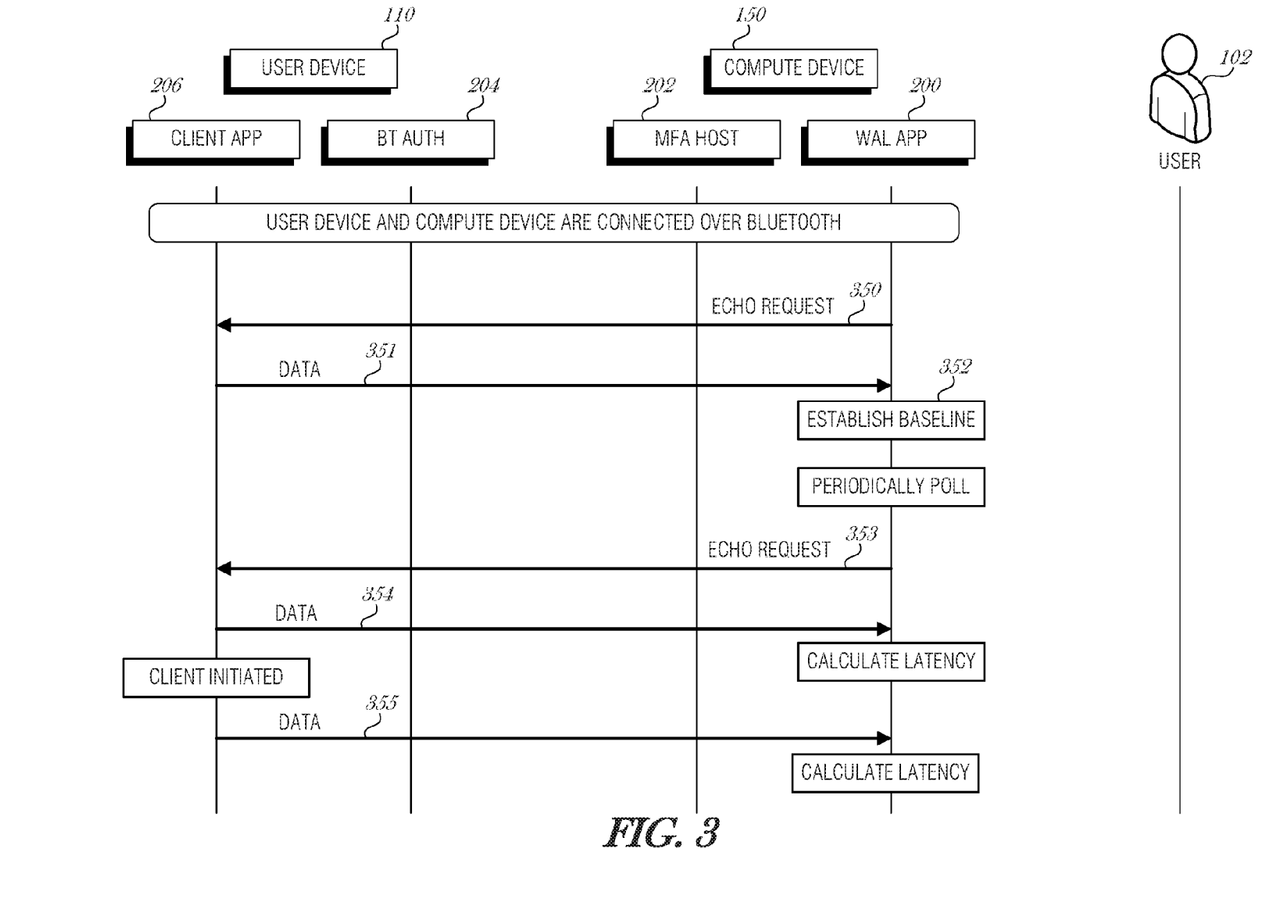
FIG. 3 is a swim lane diagram illustrating message traffic between the user device and the compute device to implement a walk-away lock, according to an embodiment.

FIG. 3 is a swim lane diagram illustrating message traffic between the user device 110 and the compute device 150 to implement a walk-away lock, according to an embodiment. The compute device 150 establishes a baseline latency measurement by requesting a number of messages from the user device 110. In particular, the WAL app 200 on the compute device 150 may transmit one or more echo request messages to client app 206 executing on the user device 110 via Bluetooth pathways (message/operation 350). In an example, to establish a baseline latency measurement, two echo request messages are sent and the responses are averaged. In another example, to establish a baseline latency measurement, eight echo request messages are sent and the responses are averaged. It is understood that any number of echo request messages may be used to establish the baseline and that the baseline may be represented as an average, a moving average, a weighted average, or some other central tendency of the latency over time.

In response to each echo request message sent, the client app 206 generates and transmits a responsive data packet (message/operation 351). While only one data message (351) is shown in FIG. 3, it is understood that many may be transmitted in response to corresponding request echo messages. In an example, the responsive data packet (351) is 16 KB. It is understood that other data packet sizes may be used, such as 32 KB, 64 KB, etc.

The WAL application 200 determines the baseline latency (operation 352). In an example, the latency is computed by the WAL application 200 by starting a timer at the start of receiving an echo response data packet, and then stopping the timer at the end of receiving the echo response data packet. The time interval represents the time to receive the data packet and may be stored as the latency. Multiple measurements may be aggregated and used to determine the baseline latency.

The baseline latency measurement may be revised at certain times. For example, when user input is detected at the compute device 150, such as a mouse movement, keyboard input, etc., the user 102 is likely proximate to the compute device 150, and a new baseline latency value may be determined. This may be useful to update the baseline latency measure, for example, if the user 102 were checking their phone for voicemails and then put the phone down on their desk in a different spot or in their pocket, after finishing using their phone. As such, the Bluetooth latency measurements may be slightly different, and when the user 102 goes back to work on the compute device 150, a new baseline latency measurement may be established to reflect the new positions of the respective devices.

This latency measure taken over a period of time basically determines the proximity of the user device 110 (e.g., phone or wearable) to the compute device 150 (e.g., computer workstation), thus indicating the proximity of the user 102 to the compute device 150.

After the baseline latency is established, a number of various mechanisms may be used to track the proximity of the user device 110, and hence the proximity of the user 102. In an example, the WAL application 200 may periodically transmit echo request messages to the client app 206. The WAL application 200 may then measure the time it takes to receive the responsive data packet from the client app 206 and compare the latency value to the baseline latency. This is illustrated with messages 353 and 354. The polling period may be set to any interval, such as once a second, once every three seconds, etc. The polling period may be configurable by an administrative user or by the provider of the WAL application 200.

Alternatively, the client app 206 may be configured to transmit a data packet to the WAL application 200 based on some trigger activity (message/operation 355). The trigger activity may be a timer, in which case the client app 206 may transmit a data packet on some regular interval. The trigger activity may be an environmental event, such as when movement of the user device 110 is detected. For example, the user device 110 may include an accelerometer or a gyrometer to detect various motions in free space. If a threshold amount of movement is detected, then the user device 110 may transmit a data packet to the WAL application 200. As another example, the environmental trigger activity may be a certain amount of positional change as detected by a location-based system in the user device 110 (e.g., GPS, indoor positioning system (IPS), or the like). Using a location-based system, the user device 110 may determine that the user 102 has moved more than some threshold distance, say ten feet, at which point a data packet may be generated and sent to the WAL application 200. By having the user device 110 initiate the data packet transmissions, the user device 110 is more power efficient. Thus, in an embodiment, latency measurements are only taken when there is a movement in order to save power/battery life of the user device 110.

To determine the operational latency, a number of samples may be used to account for variability in latency readings. For example, a number of latency measurements may be averaged using a weighted function. In an example, the weighted mean is calculated using the function:

$$W\_MEAN = 0.3 * MEAN(previous\_samples) + 0.7 * last\_sample \qquad \text{Function 1.}$$

where W_MEAN is a weighted mean, last_sample is the most recent latency measurement obtained, and previous_samples is the set of samples in a moving window that does not include the last_sample. The set of samples may be of any size more than one. In an embodiment, the set of samples is eight, such that eight samples are averaged and weighted with the value 0.3, and the ninth (most recent)

sample is weighted with the value 0.7, and added to the weighted mean of the previous eight samples, to obtain the W_MEAN value.

Samples may be filtered using various techniques to remove outliers and spurious data. In an embodiment, a derivative is taken using the weighted mean (W_MEAN) and the duration since when the last sample was taken. The function:

$$\text{Derivative} = \frac{\text{current\_sample} - \text{W\_Mean}}{t}. \qquad \text{Function 2}$$

where the current_sample is the sample under consideration, W_MEAN is the weighted mean as calculated using Function 1, and t is the time since when the last sample before the current_sample was taken in seconds. The WAL application 200 may analyze the Derivative and determine if it is greater than some threshold derivative value. In an embodiment, the threshold derivative value is 0.08. It is understood that any threshold derivative value may be used according to the design of the system. If the Derivative is greater than the derivative threshold value, then the current_sample is discarded and not saved (e.g., not used in the W_MEAN calculation on subsequent iterations). If the Derivative is less than or equal to the threshold derivative value, then the current_sample is stored and added to the set of saved samples previous_samples. The oldest save sample is removed when the current_sample is added to the set of saved samples.

Using the ongoing latency measurements, the user device's position (and hence the user's position) is determined. If the latency exceeds a percent threshold over the baseline latency, then user proximity is beyond a threshold distance and the WAL application 200 will automatically conduct a security operation on the compute device 150. The "away" threshold percent may be set to any percent. In an embodiment, the away threshold percent is set to 30%, such that if the latency grows to be over 130% of the baseline latency, then the user 102 is considered to be away from the compute device. In an embodiment, the compute device 150 may lock the screen. In another embodiment, the compute device 150 may lock another resource, such as an executing application, a browser window, a browser application, a communication session, or the like.

If the latency falls below a percent threshold, then user 102 is detected to be close to the compute device 150 and the screen will automatically unlock. In an embodiment, the percent threshold is 20%, such that if the detected latency is less than 20% from the baseline latency, then the user 102 is considered to be close enough to the compute device 150 that unlocking the compute device 150 is not an insecure process. The return threshold percent may be lower than the "away" threshold percent to account for false positives that may be a product of slight fluctuations in the current_value. In other words, fluctuations in the current_value may make the user 102 appear to be away and then return, when in fact they have not moved.

Figure 4:
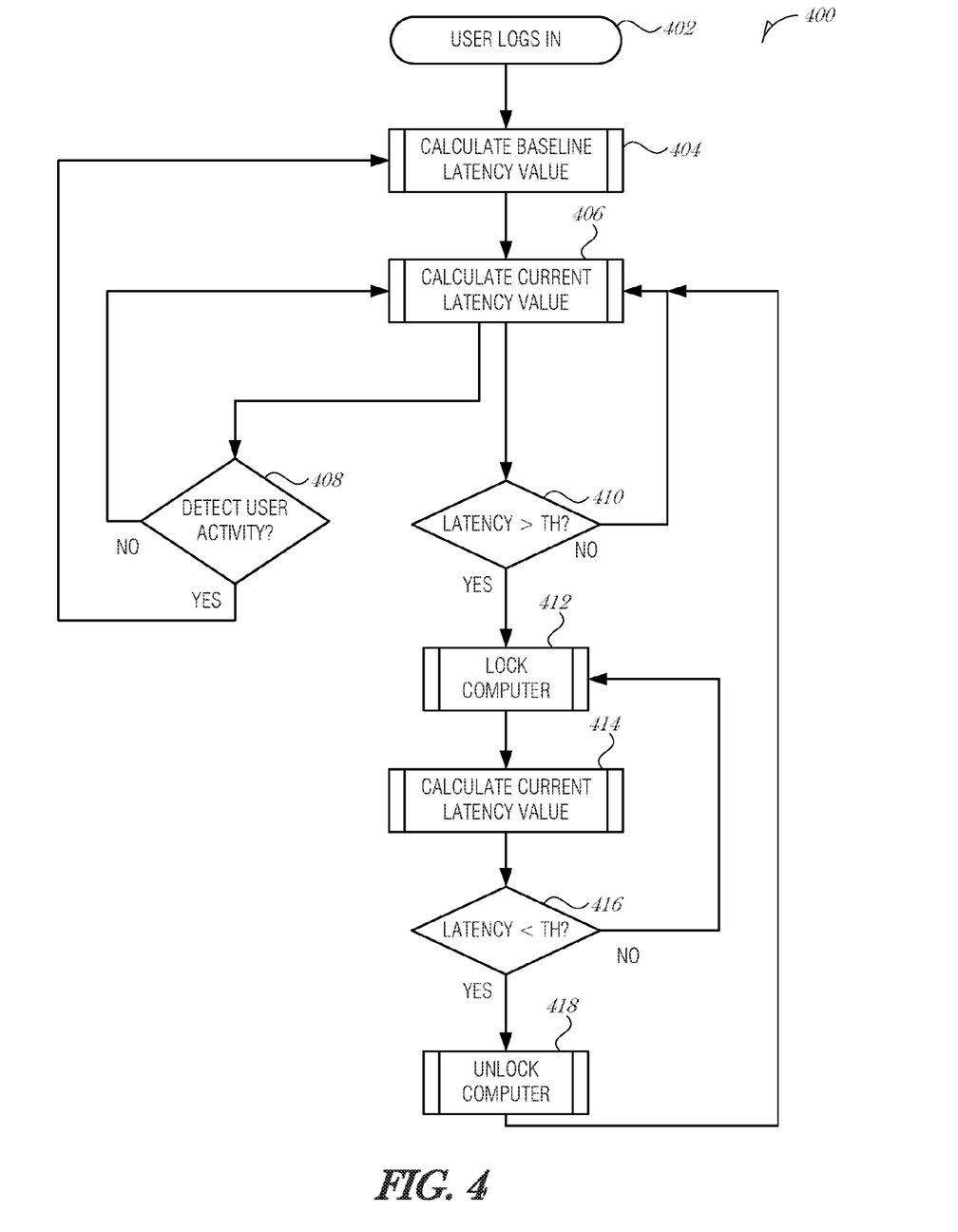
FIG. 4 is a flowchart illustrating a walk away lock process, according to an embodiment.

FIG. 4 is a flowchart illustrating a walk away lock process 400, according to an embodiment. A user logs into to a compute device, such as a workstation (operation 402). The user has a Bluetooth enabled device in his possession, and after logging into the compute device, the user's device and the compute device connect. The compute device calculates a baseline latency value (operation 404). For example, the compute device may transmit two echo requests to the user's device and receive data packets in response to each request. Using the transmission time to receive the data packets, the compute device is able to calculate an average latency value (operation 404). Additional packets may be requested to further determine a more accurate latency.

Over time, additional packets are received by the compute device and a current latency value is obtained (operation 406). The data packets may be requested by the compute device or may be provided without prompting from the user's device, or a combination of such data transmissions may be used. The current latency value may be calculated using a weighted function, for example Function 1 from above. As part of the current latency calculation in operation 406, outlier values may be filtered, such as by using Function 2 from above.

After calculating the current latency value, the compute device may periodically update the value based on requested information or other data received from the user's device.

When the user is actively using the compute device (e.g., typing, mousing, or the like) (decision block 408), then the user's presence is a given and a new baseline may be computed (return to operation 404).

Based on the ongoing monitoring of the current latency value, the compute device is able to detect when the latency grows to exceed a threshold value (decision block 410). The latency threshold may be a percentage value over the baseline latency established in block 404. Alternatively, the latency value may be a fixed value (e.g., 20 milliseconds), such that if the current latency exceed the baseline latency by more than the fixed value, the user is inferred as having walked away from the compute device.

If the current latency does not exceed the threshold value, then the process flow returns to block 406, where the current latency is monitored. If the current latency does exceed the threshold, then the compute device is locked or some other security action is performed (e.g., logging, notifying an administrator, etc.).

After being locked, the compute device continues to monitor the latency of communications between the user's device and the compute device. Bluetooth range may be far (e.g., up to 100 meters (328 feet)), depending on the transmit power of the Bluetooth radio. As such, the user may traverse quite a ways away from the compute device before losing Bluetooth connectivity—allowing the compute device to monitor the latency values for quite some time.

The latency may be recalculated (operation 414) and checked to determine whether the current latency is less than a threshold (decision 416). The threshold used in decision 416 may be different than that of the threshold used in decision block 410.

If the current latency is still too high, then the process flow returns to the lock computer state (operation 412). If the current latency falls under the threshold amount, indicating that the user has returned to the compute device, then the compute device is unlocked (operation 418), and process flow returns to operation 406, where a current latency value is obtained. A new baseline may be calculated relatively soon after the user returns, based on the process flow through decision block 408.

Figure 5:
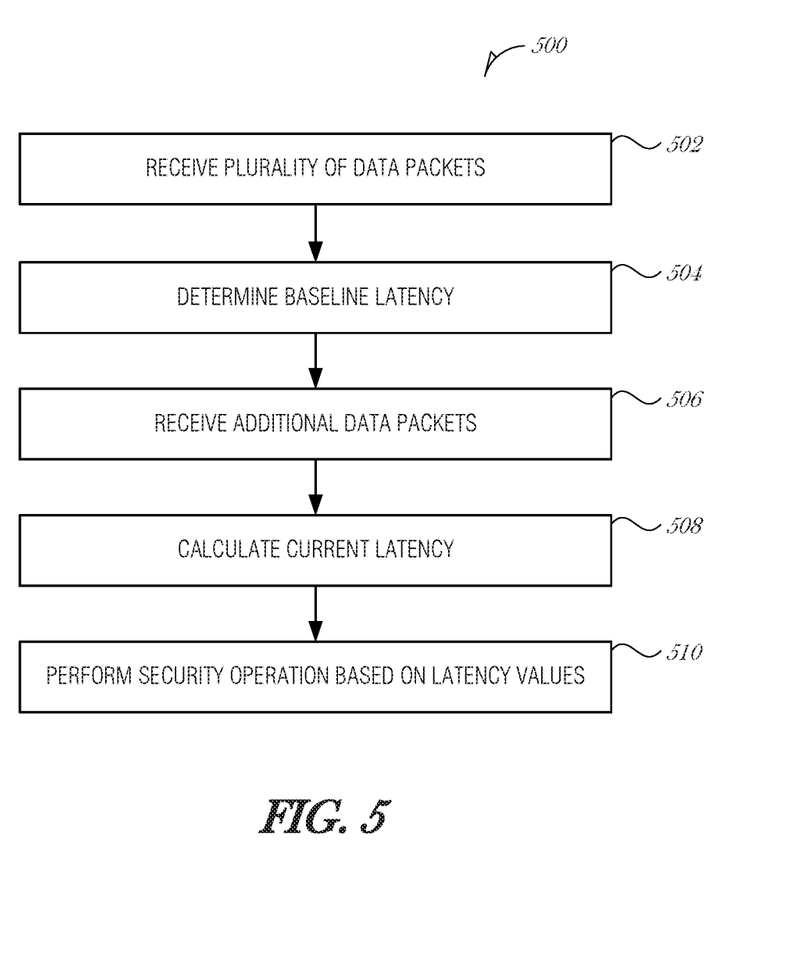
FIG. 5 is a flowchart illustrating a method for providing a walk away lock, according to an embodiment.

FIG. 5 is a flowchart illustrating a method 500 for providing a walk away lock, according to an embodiment. At block 502, a plurality of data packets is received, at a compute device from a user device, each packet having corresponding time-to-receive values. In an embodiment, receiving the plurality of data packets is performed over a Bluetooth connection. In an embodiment, the a particular time-to-receive value of the plurality of time-to-receive values comprises the time period from when the compute device started receiving a first byte of the data packet to when the compute device finished receiving a last byte of the data packet.

In an embodiment, receiving the plurality of data packets comprises transmitting a request for a data packet to the user device and receiving a response from the user device. In a further embodiment, the response comprises a fixed-size data packet. In a further embodiment, the fixed-size data packet is 16 KB.

In an embodiment, receiving the plurality of data packets comprises receiving a data packet from the user device, where the compute device transmitted the data packet to the user device without prompting from the compute device. In a further embodiment, the user device transmitted the data packet to the compute device based on a timer executing on the user device.

At block 504, a baseline latency value of the plurality of data packets is determined based on the respective time-to-receive values. In an embodiment, determining the baseline latency comprises averaging the corresponding time-to-receive values of the plurality of data packets.

At block 506, additional data packets are received from the user device, each of the additional data packets having corresponding time-to-receive values. In an embodiment, receiving additional data packets from the user device is performed over a Bluetooth connection.

At block 508, a current latency value of the additional data packets is calculated based on the respective time-to-receive values. In an embodiment, calculating the current latency value comprises averaging the corresponding time-to-receive values of the additional of data packets. In a further embodiment, averaging the corresponding time-to-receive values of the additional data packets comprises calculating a weighted average of the corresponding time-to-receive values of the additional data packets. In a further embodiment, calculating the weighted average comprises calculating a mean of a number of the corresponding time-to-receive values of the additional data packets; weighting the mean of the number of the corresponding time-to-receive values of the additional data packets, to provide a weighted mean; weighting a most recent time-to-receive value of the additional data packets, to provide a weighted recent value; and adding the weighted mean to the weighted recent value, resulting in the weighted average.

At block 510, a security operation is performed based on the baseline latency value and the current latency value.

In an embodiment, performing the security operation based on the baseline latency value and the current latency value comprises determining that the current latency exceeds the baseline latency by more than a threshold amount, and locking the compute device when the current latency exceeds the baseline latency by more than the threshold amount. In a further embodiment, the threshold amount is 30% greater than the baseline latency. In a related embodiment, the threshold amount is a fixed value greater than the baseline latency.

In an embodiment, performing the security operation based on the baseline latency value and the current latency value comprises determining that the current latency exceeds the baseline latency by less than a threshold amount, and unlocking the compute device when the current latency exceeds the baseline latency by less than the threshold amount. In a further embodiment, the threshold amount is 20% greater than the baseline latency. In a related embodiment, the threshold amount is a fixed value greater than the baseline latency.

In a further embodiment, the method 500 includes recalculating the baseline latency in response to detecting a triggering event. In a further embodiment, the triggering event comprises user activity at the compute device. In a related embodiment, the triggering event comprises a timeout period.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
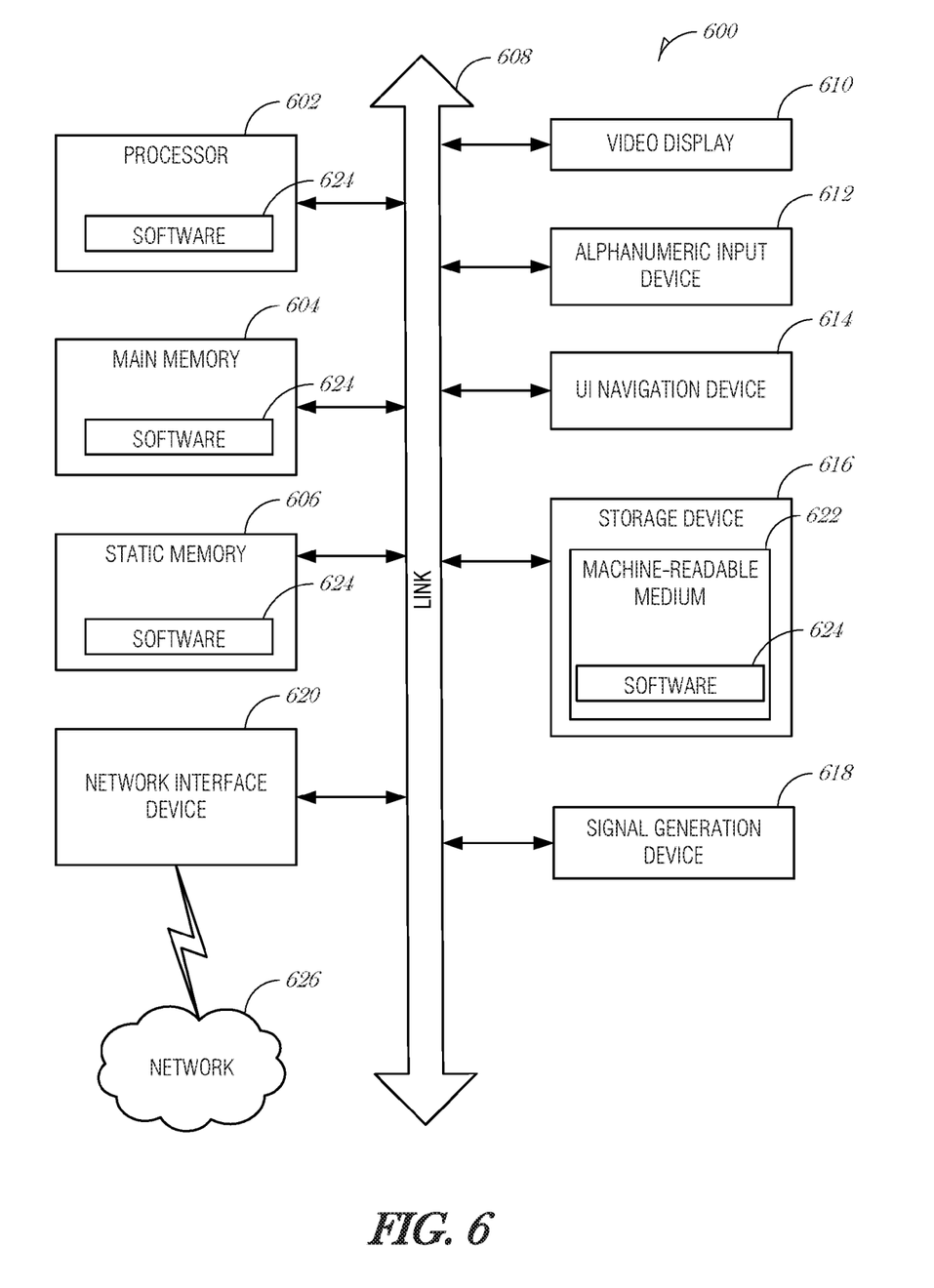
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a device of providing a walk away lock, the device comprising: a transceiver to: receive a plurality of data packets from a user device, each packet having corresponding time-to-receive values; and receive additional data packets from the user device, each of the additional data packets having corresponding time-to-receive values; and a controller to: determine a baseline latency value of the plurality of data packets based on the respective time-to-receive values; calculate a current latency value of the additional data packets based on the respective time-to-receive values; and perform a security operation based on the baseline latency value and the current latency value.

In Example 2, the subject matter of Example 1 optionally includes wherein to receive the plurality of data packets the transceiver implements a Bluetooth connection.

In Example 3, the subject matter of any one or more of Examples 1-2 optionally include wherein to receive the plurality of data packets includes the transceiver to: transmit a request for a data packet to the user device; and receive a response from the user device.

In Example 4, the subject matter of Example 3 optionally includes wherein the response comprises a fixed-size data packet.

In Example 5, the subject matter of Example 4 optionally includes wherein the fixed-size data packet is 16 KB.

In Example 6, the subject matter of any one or more of Examples 1-5 optionally include wherein to receive the plurality of data packets includes the transceiver to receive a data packet from the user device, where the user device transmitted the data packet to the transceiver without prompting from the device.

In Example 7, the subject matter of Example 6 optionally includes wherein the user device transmitted the data packet to the compute device based on a timer executing on the user device.

In Example 8, the subject matter of any one or more of Examples 1-7 optionally include wherein a particular time-to-receive value of the plurality of time-to-receive values comprises the time period from when the compute device started receiving a first byte of the data packet to when the compute device finished receiving a last bye of the data packet.

In Example 9, the subject matter of any one or more of Examples 1-8 optionally include wherein to determine the baseline latency includes the controller to average the corresponding time-to-receive values of the plurality of data packets.

In Example 10, the subject matter of any one or more of Examples 1-9 optionally include wherein to receive the additional data packets from the user device includes the transceiver arranged to implement a Bluetooth connection.

In Example 11, the subject matter of any one or more of Examples 1-10 optionally include wherein to calculate the current latency value includes the controller to average the corresponding time-to-receive values of the additional of data packets.

In Example 12, the subject matter of Example 11 optionally includes wherein to average the corresponding time-to-receive values of the additional data packets includes the controller to calculate a weighted average of the corresponding time-to-receive values of the additional data packets.

In Example 13, the subject matter of Example 12 optionally includes wherein to calculate the weighted average includes the controller to: calculate a mean of a number of the corresponding time-to-receive values of the additional data packets; weight the mean of the number of the corresponding time-to-receive values of the additional data packets, to provide a weighted mean; weight a most recent time-to-receive value of the additional data packets, to provide a weighted recent value; and add the weighted mean to the weighted recent value, resulting in the weighted average.

In Example 14, the subject matter of any one or more of Examples 1-13 optionally include wherein to perform the security operation based on the baseline latency value and the current latency value includes the controller to: determine that the current latency exceeds the baseline latency by more than a threshold amount; and lock the compute device when the current latency exceeds the baseline latency by more than the threshold amount.

In Example 15, the subject matter of Example 14 optionally includes wherein the threshold amount is 30% greater than the baseline latency.

In Example 16, the subject matter of any one or more of Examples 14-15 optionally include wherein the threshold amount is a fixed value greater than the baseline latency.

In Example 17, the subject matter of any one or more of Examples 1-16 optionally include wherein to perform the security operation based on the baseline latency value and the current latency value includes the controller to: determine that the current latency exceeds the baseline latency by less than a threshold amount; and unlock the compute device when the current latency exceeds the baseline latency by less than the threshold amount.

In Example 18, the subject matter of Example 17 optionally includes wherein the threshold amount is 20% greater than the baseline latency.

In Example 19, the subject matter of any one or more of Examples 17-18 optionally include wherein the threshold amount is a fixed value greater than the baseline latency.

In Example 20, the subject matter of any one or more of Examples 1-19 optionally include wherein the controller is also to recalculate the baseline latency in response to detecting a triggering event.

In Example 21, the subject matter of Example 20 optionally includes wherein the triggering event comprises user activity at the compute device.

In Example 22, the subject matter of any one or more of Examples 20-21 optionally include wherein the triggering event comprises a timeout period.

Example 23 is a system of providing a walk away lock, the system comprising: means for receiving, at a compute device, a plurality of data packets from a user device, each packet having corresponding time-to-receive values; means for determining a baseline latency value of the plurality of data packets based on the respective time-to-receive values; means for receiving additional data packets from the user device, each of the additional data packets having corresponding time-to-receive values; means for calculating a current latency value of the additional data packets based on the respective time-to-receive values; and means for performing a security operation based on the baseline latency value and the current latency value.

In Example 24, the subject matter of Example 23 optionally includes wherein receiving the plurality of data packets is performed over a Bluetooth connection.

In Example 25, the subject matter of any one or more of Examples 23-24 optionally include wherein the means for receiving the plurality of data packets comprises: means for transmitting a request for a data packet to the user device; and means for receiving a response from the user device.

In Example 26, the subject matter of Example 25 optionally includes wherein the response comprises a fixed-size data packet.

In Example 27, the subject matter of Example 26 optionally includes wherein the fixed-size data packet is 16KB.

In Example 28, the subject matter of any one or more of Examples 23-27 optionally include wherein the means for receiving the plurality of data packets comprises means for receiving a data packet from the user device, where the user device transmitted the data packet to the compute device without prompting from the compute device.

In Example 29, the subject matter of Example 28 optionally includes wherein the user device transmitted the data packet to the compute device based on a timer executing on the user device.

In Example 30, the subject matter of any one or more of Examples 23-29 optionally include wherein a particular time-to-receive value of the plurality of time-to-receive values comprises the time period from when the compute device started receiving a first byte of the data packet to when the compute device finished receiving a last bye of the data packet.

In Example 31, the subject matter of any one or more of Examples 23-30 optionally include wherein the means for determining the baseline latency comprises means for averaging the corresponding time-to-receive values of the plurality of data packets.

In Example 32, the subject matter of any one or more of Examples 23-31 optionally include wherein receiving additional data packets from the user device is performed over a Bluetooth connection.

In Example 33, the subject matter of any one or more of Examples 23-32 optionally include wherein the means for calculating the current latency value comprises means for averaging the corresponding time-to-receive values of the additional of data packets.

In Example 34, the subject matter of Example 33 optionally includes wherein the means for averaging the corresponding time-to-receive values of the additional data packets comprises means for calculating a weighted average of the corresponding time-to-receive values of the additional data packets.

In Example 35, the subject matter of Example 34 optionally includes wherein the means for calculating the weighted average comprises: means for calculating a mean of a number of the corresponding time-to-receive values of the additional data packets; means for weighting the mean of the number of the corresponding time-to-receive values of the additional data packets, to provide a weighted mean; means for weighting a most recent time-to-receive value of the additional data packets, to provide a weighted recent value; and means for adding the weighted mean to the weighted recent value, resulting in the weighted average.

In Example 36, the subject matter of any one or more of Examples 23-35 optionally include wherein the means for performing the security operation based on the baseline latency value and the current latency value comprises: means for determining that the current latency exceeds the baseline latency by more than a threshold amount; and means for locking the compute device when the current latency exceeds the baseline latency by more than the threshold amount.

In Example 37, the subject matter of Example 36 optionally includes wherein the threshold amount is 30% greater than the baseline latency.

In Example 38, the subject matter of any one or more of Examples 36-37 optionally include wherein the threshold amount is a fixed value greater than the baseline latency.

In Example 39, the subject matter of any one or more of Examples 23-38 optionally include wherein the means for performing the security operation based on the baseline latency value and the current latency value comprises: means for determining that the current latency exceeds the baseline latency by less than a threshold amount; and means for unlocking the compute device when the current latency exceeds the baseline latency by less than the threshold amount.

In Example 40, the subject matter of Example 39 optionally includes wherein the threshold amount is 20% greater than the baseline latency.

In Example 41, the subject matter of any one or more of Examples 39-40 optionally include wherein the threshold amount is a fixed value greater than the baseline latency.

In Example 42, the subject matter of any one or more of Examples 23-41 optionally include means for recalculating the baseline latency in response to detecting a triggering event.

In Example 43, the subject matter of Example 42 optionally includes wherein the triggering event comprises user activity at the compute device.

In Example 44, the subject matter of any one or more of Examples 42-43 optionally include wherein the triggering event comprises a timeout period.

Example 45 is a method of providing a walk away lock, the method comprising: receiving, at a compute device, a plurality of data packets from a user device, each packet having corresponding time-to-receive values; determining a baseline latency value of the plurality of data packets based on the respective time-to-receive values; receiving additional data packets from the user device, each of the additional data packets having corresponding time-to-receive values; calculating a current latency value of the additional data packets based on the respective time-to-receive values; and performing a security operation based on the baseline latency value and the current latency value.

In Example 46, the subject matter of Example 45 optionally includes wherein receiving the plurality of data packets is performed over a Bluetooth connection.

In Example 47, the subject matter of any one or more of Examples 45-46 optionally include wherein receiving the plurality of data packets comprises: transmitting a request for a data packet to the user device; and receiving a response from the user device.

In Example 48, the subject matter of Example 47 optionally includes wherein the response comprises a fixed-size data packet.

In Example 49, the subject matter of Example 48 optionally includes wherein the fixed-size data packet is 16 KB.

In Example 50, the subject matter of any one or more of Examples 45-49 optionally include wherein receiving the plurality of data packets comprises receiving a data packet from the user device, where the compute device transmitted the data packet to the user device without prompting from the compute device.

In Example 51, the subject matter of Example 50 optionally includes wherein the user device transmitted the data packet to the compute device based on a timer executing on the user device.

In Example 52, the subject matter of any one or more of Examples 45-51 optionally include wherein a particular time-to-receive value of the plurality of time-to-receive values comprises the time period from when the compute device started receiving a first byte of the data packet to when the compute device finished receiving a last bye of the data packet.

In Example 53, the subject matter of any one or more of Examples 45-52 optionally include wherein determining the baseline latency comprises averaging the corresponding time-to-receive values of the plurality of data packets.

In Example 54, the subject matter of any one or more of Examples 45-53 optionally include wherein receiving additional data packets from the user device is performed over a Bluetooth connection.

In Example 55, the subject matter of any one or more of Examples 45-54 optionally include wherein calculating the current latency value comprises averaging the corresponding time-to-receive values of the additional of data packets.

In Example 56, the subject matter of Example 55 optionally includes wherein averaging the corresponding time-to-receive values of the additional data packets comprises calculating a weighted average of the corresponding time-to-receive values of the additional data packets.

In Example 57, the subject matter of Example 56 optionally includes wherein calculating the weighted average comprises: calculating a mean of a number of the corresponding time-to-receive values of the additional data packets; weighting the mean of the number of the corresponding time-to-receive values of the additional data packets, to provide a weighted mean; weighting a most recent time-to-receive value of the additional data packets, to provide a weighted recent value; and adding the weighted mean to the weighted recent value, resulting in the weighted average.

In Example 58, the subject matter of any one or more of Examples 45-57 optionally include wherein performing the security operation based on the baseline latency value and the current latency value comprises: determining that the current latency exceeds the baseline latency by more than a threshold amount; and locking the compute device when the current latency exceeds the baseline latency by more than the threshold amount.

In Example 59, the subject matter of Example 58 optionally includes wherein the threshold amount is 30% greater than the baseline latency.

In Example 60, the subject matter of any one or more of Examples 58-59 optionally include wherein the threshold amount is a fixed value greater than the baseline latency.

In Example 61, the subject matter of any one or more of Examples 45-60 optionally include wherein performing the security operation based on the baseline latency value and the current latency value comprises: determining that the current latency exceeds the baseline latency by less than a threshold amount; and unlocking the compute device when the current latency exceeds the baseline latency by less than the threshold amount.

In Example 62, the subject matter of Example 61 optionally includes wherein the threshold amount is 20% greater than the baseline latency.

In Example 63, the subject matter of any one or more of Examples 61-62 optionally include wherein the threshold amount is a fixed value greater than the baseline latency.

In Example 64, the subject matter of any one or more of Examples 45-63 optionally include recalculating the baseline latency in response to detecting a triggering event.

In Example 65, the subject matter of Example 64 optionally includes wherein the triggering event comprises user activity at the compute device.

In Example 66, the subject matter of any one or more of Examples 64-65 optionally include wherein the triggering event comprises a timeout period.

Example 67 is at least one machine readable medium including instructions that, when executed by a machine, cause the machine to perform a method of any of Examples 45-66.

Example 68 is a system including means to perform a method of any of Examples 45-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device of providing a walk away lock, the device comprising:
   a transceiver to:
      receive a plurality of data packets from a user device, each packet having corresponding time-to-receive values; and
      receive additional data packets from the user device, each of the additional data packets having corresponding time-to-receive values; and
   a controller to:
      determine a baseline latency value of the plurality of data packets based on the respective time-to-receive values;
      calculate a current latency value of the additional packets based on the respective time-to-receive values; and
      perform a security operation based on the baseline latency value and the current latency value;
      wherein a particular time-to-receive value of the plurality of time-to-receive values comprises the time period from when the compute device started receiving a first byte of the data packet to when the compute device finished receiving a last bye of the data packet, and
      wherein to calculate the current latency value includes the controller to average the corresponding time-to-receive values of the additional of data packets.

2. The device of claim 1, wherein to receive the plurality of data packets includes the transceiver to:
   transmit a request for a data packet to the user device; and
   receive a response from the user device.

3. The device of claim 2, wherein the response comprises a fixed-size data packet.

4. The device of claim 3, wherein the fixed-size data packet is 16 KB.

5. The device of claim 1, wherein to receive the plurality of data packets includes the transceiver to receive a data packet from the user device, where the user device transmitted the data packet to the transceiver without prompting from the device.

6. The device of claim 5, wherein the user device transmitted the data packet to the compute device based on a timer executing on the user device.

7. The device of claim 1, wherein to average the corresponding time-to-receive values of the additional data packets includes the controller to calculate a weighted average of the corresponding time-to-receive values of the additional data packets.

8. The device of claim 7, wherein to calculate the weighted average includes the controller to:
calculate a mean of a number of the corresponding time-to-receive values of the additional data packets;
weight the mean of the number of the corresponding time-to-receive values of the additional data packets, to provide a weighted mean;
weight a most recent time-to-receive value of the additional data packets, to provide a weighted recent value; and
add the weighted mean to the weighted recent value, resulting in the weighted average.

9. The device of claim 1, wherein to perform the security operation based on the baseline latency value and the current latency value includes the controller to:
determine that the current latency exceeds the baseline latency by more than a threshold amount; and
lock the compute device when the current latency exceeds the baseline latency by more than the threshold amount.

10. The device of claim 9, wherein the threshold amount is 30% greater than the baseline latency.

11. The device of claim 1, wherein to perform the security operation based on the baseline latency value and the current latency value includes the controller to:
determine that the current latency exceeds the baseline latency by less than a threshold amount; and
unlock the compute device when the current latency exceeds the baseline latency by less than the threshold amount.

12. The device of claim 11, wherein the threshold amount is 20% greater than the baseline latency.

13. A method of providing a walk away lock, the method comprising:
receiving, at a compute device, a plurality of data packets from a user device, each packet having corresponding time-to-receive values;
determining a baseline latency value of the plurality of data packets based on the respective time-to-receive values;
receiving additional data packets from the user device, each of the additional data packets having corresponding time-to-receive values;
calculating a current latency value of the additional data packets based on the respective time-to-receive values; and
performing a security operation based on the baseline latency value and the current latency value;
wherein a particular time-to-receive value of the plurality of time-to-receive values comprises the time period from when the compute device started receiving a first byte of the data packet to when the compute device finished receiving a last bye of the data packet.

14. The method of claim 13, wherein receiving the plurality of data packets comprises:
transmitting a request for a data packet to the user device; and
receiving a response from the user device.

15. The method of claim 13, wherein receiving the plurality of data packets comprises receiving a data packet from the user device, where the compute device transmitted the data packet to the user device without prompting from the compute device.

16. The method of claim 15, wherein the user device transmitted the data packet to the compute device based on a timer executing on the user device.

17. At least one non-transitory machine readable medium including instructions that, when executed by a machine, cause the machine to:
receive a plurality of data packets from a user device, each packet having corresponding time-to-receive values;
determine a baseline latency value of the plurality of data packets based on the respective time-to-receive values;
receive additional data packets from the user device, each of the additional data packets having corresponding time-to-receive values;
calculate a current latency value of the additional data packets based on the respective time-to-receive values; and
perform a security operation based the baseline latency value and the current latency value;
wherein a particular time-to-receive value of the plurality of time-to-receive values comprises the time period from when the compute device started receiving a first byte of the data packet to when the compute device finished receiving a last bye of the data packet, and
wherein to calculate the current latency value, the instructions cause the machine to average the corresponding time-to-receive values of the additional of data packets.

18. The at least one machine readable medium of claim 17, wherein to receive the plurality of data packets includes the instructions causing the machine to:
transmit a request for a data packet to the user device; and
receive a response from the user device.

19. The at least one machine readable medium of claim 18, wherein the response comprises a fixed-size data packet.

20. The at least one machine readable medium of claim 19, wherein the fixed-size data packet is 16 KB.

21. The at least one machine readable medium claim 17, wherein to receive the plurality of data packets includes the instructions causing the machine to receive a data packet from the user device, where the user device transmitted the data packet to the transceiver without prompting from the device.

22. The at least one machine readable medium of claim 21, wherein the user device transmitted the data packet to the compute device based on a timer executing on the user device.

23. The at least one machine readable medium of claim 17, wherein to average the corresponding time-to-receive values of the additional data packets includes the instructions causing the machine to calculate a weighted average of the corresponding time-to-receive values of the additional data packets.

24. The at least one machine readable medium of claim 23, wherein to calculate the weighted average includes the instructions causing the machine to:
calculate a mean of a number of the corresponding time-to-receive values of the additional data packets;
weight the mean of the number of the corresponding time-to-receive values of the additional data packets, to provide a weighted mean;

weight a most recent time-to-receive value of the additional data packets, to provide a weighted recent value; and add the weighted mean to the weighted recent value, resulting in the weighted average.

\* \* \* \* \*

UNITED STATES PATENT AND TRADEMARK OFFICE
CERTIFICATE OF CORRECTION

| | |
|---|---|
| PATENT NO. | : 10,284,566 B2 |
| APPLICATION NO. | : 15/088771 |
| DATED | : May 7, 2019 |
| INVENTOR(S) | : Khosravi et al. |

It is certified that error appears in the above-identified patent and that said Letters Patent is hereby corrected as shown below:

In Column 18, Line 47, in Claim 1, before "packets", insert --data--

In Column 18, Line 59, in Claim 1, after "additional", delete "of"

In Column 20, Line 25, in Claim 17, after "based", insert --on--

In Column 20, Line 34, in Claim 17, after "additional", delete "of"

In Column 20, Line 35, in Claim 18, after "one", insert --non-transitory--

In Column 20, Line 40, in Claim 19, after "one", insert --non-transitory--

In Column 20, Line 42, in Claim 20, after "one", insert --non-transitory--

In Column 20, Line 44, in Claim 21, after "one", insert --non-transitory--

In Column 20, Line 44, in Claim 21, after "medium", insert --of--

In Column 20, Line 50, in Claim 22, after "one", insert --non-transitory--

In Column 20, Line 54, in Claim 23, after "one", insert --non-transitory--

In Column 20, Line 60, in Claim 24, after "one", insert --non-transitory--

Signed and Sealed this
Fifth Day of May, 2020

Andrei Iancu
*Director of the United States Patent and Trademark Office*